United States Patent Office 3,293,288
Patented Dec. 20, 1966

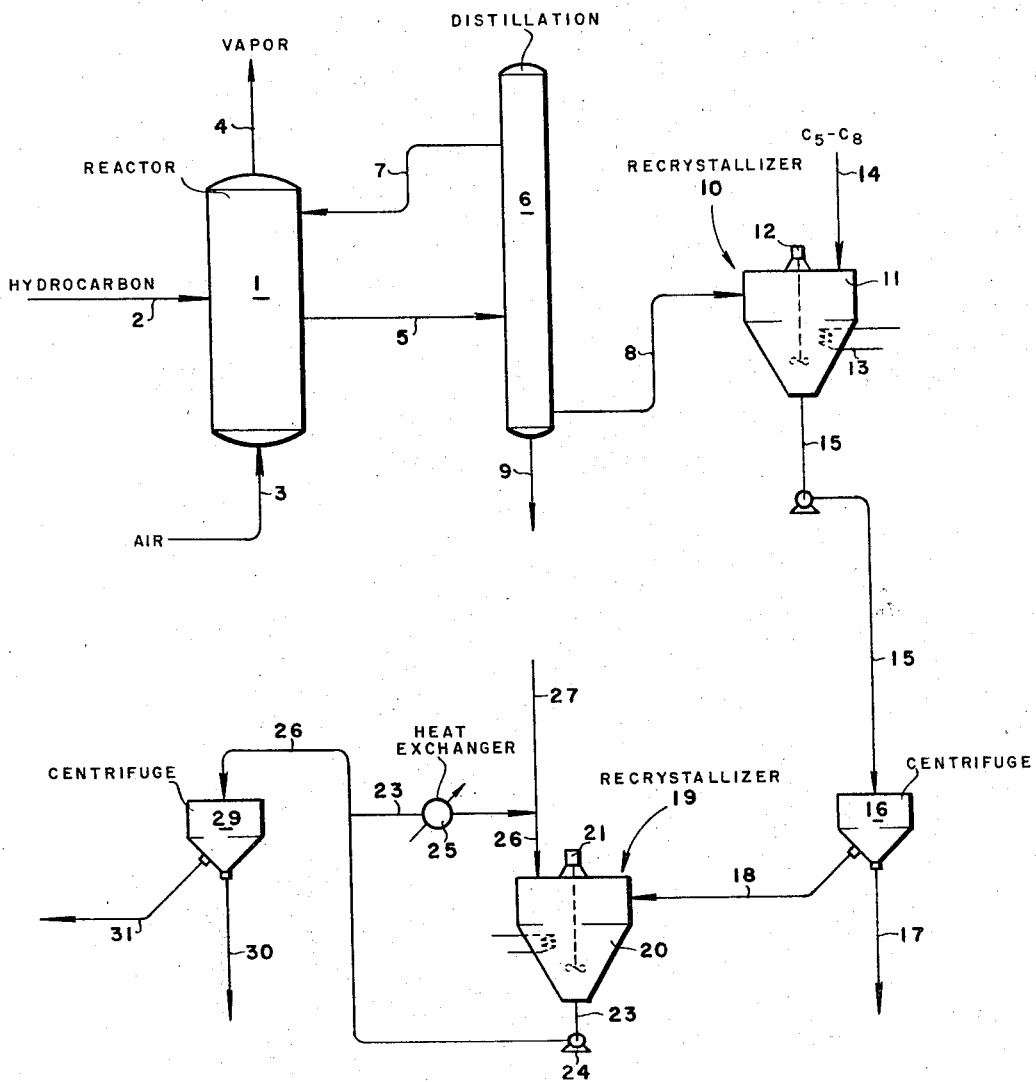

3,293,288
PROCESS FOR THE SEPARATION OF MONOBASIC AND DIBASIC AROMATIC ACIDS
Harry E. Cier and Hulen L. Wilder, Baytown, Tex., assignors, by mesne assignments, to Esso Research and Engineering Company, Elizabeth, N.J., a corporation of Delaware
Filed Dec. 2, 1963, Ser. No. 327,309
9 Claims. (Cl. 260—525)

The present invention is directed to the separation of monobasic and dibasic $C_8$ and $C_9$ aromatic acids. More particularly, the invention deals with the solvent separation of monobasic and dibasic $C_8$ and $C_9$ aromatic acids from mixtures which may include neutral materials. In its more specific aspects, the invention is concerned with the separation of mixtures of the monobasic and dibasic $C_8$ and $C_9$ aromatic acids from each other and from neutral materials to obtain the $C_8$ and $C_9$ acids in high purity by a solvent separation utilizing $C_5$ to $C_8$ saturated liquid hydrocarbons as solvents.

The present invention may be briefly described as a method for separating the monobasic $C_8$ and $C_9$ aromatic acids from the corresponding dibasic acids from a mixture which may further contain neutral materials by heating the mixture with a saturated $C_5$ to $C_8$ liquid hydrocarbon to a temperature of about but not exceeding the boiling point of the solution whereby the monobasic acid and neutral materials will dissolve in the hydrocarbon while the dibasic aromatic acid remains as a solid. A simple liquid-solid separation separates the dibasic acid from the mixture. The hot mixture of the monobasic acid and the neutral materials in the $C_5$ to $C_8$ hydrocarbon is then cooled to a temperature within the range of about 0 to about 100° F. whereby the monobasic aromatic acid precipitates as a solid while the neutral materials remain in soluton. Again, a simple sold-liquid separation enables the monobasic acid to be recovered in high purity.

The $C_5$ to $C_8$ hydrocarbons are added to a mixture of monobasic and dibasic acids to be separated such that the ratio of the saturated $C_5$ to $C_8$ liquid hydrocarbons to a mixture including the monobasic and dibasic acids and neutral materials is between about 1:5 to about 5:1. The desired ratio of solvent to the mixture of monobasic and dibasic acids and neutral materials may be chosen to add excess solvent initially so as to accomplish the two separate separations, or the ratio of solvent to the mixture of acids and neutral materials may be controlled in each of the separations. It is obvious that more solvent is necessary to dissolve the monobasic acid when separating the dibasic acid than in the second separation when separating the monobasic acid from the neutral materials. Accordingly, the saturated $C_5$ to $C_8$ liquid hydrocarbons are added so that they are present in the first separation in the amount of about 15 to about 85 volume percent.

The present invention has particular advantage in separating the monobasic acid from the dibasic acid formed in the oxidaton of $C_8$ and $C_9$ aromatic hydrocarbons by molecular oxygen to produce the dibasic acids. The oxidation of the $C_8$ and $C_9$ aromatic hydrocarbons is usually carried out in liquid phase with air and a catalyst. Effective catalysts in the oxidation are heavy metal salts, such as salts of cobalt, manganese or the like. Such an oxidation while producing the dibasic acid produces a product containing a mixture of compounds. The mixture of products contains the monobasic acid and neutral materials as well as the dibasic acid. The acids formed by the air oxidation of the $C_8$ and $C_9$ aromatic hydrocarbons have been found to have utility as solvents and modifiers for alkyd resins and the like. In accordance with the present invention, the monobasic and dibasic acids may be easily separated by a simple solvent separation to recover the dibasic and monobasic acids in high purity.

In accordance with the present invention the monobasic and dibasic $C_8$ and $C_9$ aromatic acids are separated by mixing the mixture with a $C_5$ to $C_8$ saturated hydrocarbon. The $C_5$ to $C_8$ saturated hydrocarbon which may be used in accordance with the present invention is illustrated by pentane, isopentane, hexanes, heptanes, cyclohexane, methyl cyclopentane, dimethyl cyclopentanes, methyl cyclohexane, dimethyl cyclohexanes or a mixture of the aforesaid compounds. The saturated $C_5$ to $C_8$ hydrocarbons are unique in their ability to allow the simple liquid-solid separation of the dibasic acid from the mixture of a monobasic acid and the neutral materials as well as the separation of the monobasic acid from the neutral materials.

The present invention will be further described with reference to the drawing which discloses a preferred mode of the invention.

In the preferred mode the mixture of monobasic and dibasic $C_8$ and $C_9$ aromatic acids are produced by the oxidation of the corresponding $C_8$ or $C_9$ aromatic hydrocarbon. In the air oxidation of xylenes a mixture of the monobasic and dibasic acid is produced. The reaction takes place in a reaction vessel 1. The hydrocarbon is introduced to reaction vessel 1 by line 2. The hydrocarbon may be ortho-, meta-, or para-xylene or a mixture thereof or a $C_9$ hydrocarbon. The molecular oxygen, which is preferably air, is introduced by line 3 into the reaction vessel 1. Likewise, by line 3 may be introduced a catalyst such as cobalt naphthenate. The oxidation may be carried out at conditions wherein the temperature is maintained at about 150 to about 300° C. and at a pressure of about 1 to about 20 atmospheres. The specific oxidation is not a part of the present invention.

From the top of the reaction vessel 1, vapor may be removed by line 4. The reaction product is removed from the reaction vessel 1 by line 5. The reaction product is introduced into a simple distillation zone 6 where unreacted hydrocarbon and the light ends are removed from the reaction product and recirculated to the reaction vessel 1 by line 7. The remaining materials of the reaction product in the distillation zone 6 are the desired monobasic and dibasic acids together with neutral materials and heavy ends. In most instances, the monobasic and dibasic acids are too high boiling to separate easily from the heavy ends by distillation. Hence, the reaction product, including heavy ends, is passed from the distillation zone 6 by line 8 to a first recrystallizer 10. The heavy ends may, in some instances, be removed as a bottoms product from distillation zone 6 by line 9, and then the remaining materials which are the desired monobasic and dibasic acids together with neutral materials are passed from the distillation zone 6 through line 8 as a heart cut or middle fraction. If the heavy ends are not removed from the distillation zone 6, they remain with the neutral materials throughout the recovery steps.

The recrystallizer 10 consists of a mixing tank 11 having a stirrer 12 therein. Also within the tank 11 may be a heat exchange coil 13 to control the temperature of the mixture. While a heat exchange coil 13 is illustrated, it is obvious that the tank 11 may be insulated in a heat exchange relationship or provided with other means for controlling the temperature of the mixture in recrystallizer 10.

According to the present invention, a saturated $C_5$ to $C_8$ liquid hydrocarbon is added by line 14 to recrystallizer 10 to be mixed with the mixture of monobasic and dibasic aromatic acid and neutral materials. A preferred saturated hydrocarbon is normal hexane or cyclohexane. The mixture is stirred and heated in recrystallizer 10 until the temperature approaches the boiling point of the solution. The mixture is then pumped through line 15 to a centrifuge 16 whereby a simple separation of the dibasic acid is accomplished. The dibasic acid is removed as a solid from centrifuge 16 by line 17 whereas the liquid is removed by line 18 which is a mixture of the monobasic acid and neutral materials.

The mixture of the monobasic aromatic acid and neutral materials is introduced into a second recrystallizer 19. Recrystallizer 19 consists of a tank 20 having a stirrer 21 therein. The recrystallizer may have a heat exchange coil 22 therein, but it is preferred that it be provided with a pump-around system consisting of line 23, pump 24 and a heat exchange means 25 which circulates the mixture and reintroduces it into tank 20 by line 26. The hot mixture of the monobasic acid, neutral materials and the saturated $C_5$ to $C_8$ hydrocarbon is cooled to a temperature within a range of about 0 to about 100° F. As the solution is cooled, the monobasic acid precipitates as a solid. Additional normal hexane or cyclohexane may be introduced into recrystallizer 19 by line 27. The addition of hydrocarbon by line 27 is optional and is used to optimize the ratio of solvent to oxygenated materials. The solid slurry is removed from recrystallizer 19 by line 28 and introduced into a centrifuge 29 whereby substantially pure monobasic acid may be recovered by line 30. The remaining liquid material, which is the normal hexane or cyclohexane and neutral materials and heavy ends if not previously removed, is recovered by line 31.

As can be seen from the foregoing preferred mode, phthalic acids may be separated from toluic acids by simple solid-liquid separations. While the preferred mode utilizes a recrystallizer and centrifuge in the two separations, they merely illustrate the present invention. Other means for separating solids from liquids may be used.

The present invention is further illustrated by the following examples.

*Example 1*

A sample of o-xylene was oxidized in a batch reactor until approximately 80% of the o-xylene had been oxidized by using air as the oxidant. The various oxidation products taken from the reactor were subjected to a batch distillation in which the unreacted o-xylene and some of the low boiling materials were removed. Then, the bulk of the oxidation products were distilled overhead, leaving a small residue of very heavy materials. The products recovered overhead had a composition as set forth as the feed in Table I below. One part by weight of the feed was added to two parts by weight of n-hexane, and the mixture was heated and stirred at the boiling point of the n-hexane (about 156° F.). The boiling point of the entire solution was between about 160 and about 200° F. When no more of the oxidation products appeared to be going into solution, the solution was decanted from the vessel, leaving an insoluble residue. The decanted solution was transferred to another vessel and chilled to approximately 40° F. in ice water. A large amount of crystals precipitated from the solution and were recovered by a simple filtration. The analysis of the various materials recovered are set forth in Table I on a solvent-free basis.

TABLE I

| Sample | Feed | Insoluble | Cake | Filtrate |
|---|---|---|---|---|
| Weight Percent | 100 | 11.4 | 71.0 | 17.6 |
| Weight Percent Component: | | | | |
| o-Xylene | 0.6 | | 0.1 | 3.4 |
| Aldehyde | 4.0 | | | 23.2 |
| Benzoic Acid | 0.7 | 0.2 | 0.5 | 2.1 |
| Phthalide | 8.0 | 0.7 | 8.0 | 12.5 |
| Toluic Acid | 68.0 | 10.7 | 86.9 | 28.1 |
| Phthalic Acid | 12.8 | 86.8 | 3.1 | 3.8 |
| Diphenyls | 2.1 | 0.2 | 0.3 | 10.5 |
| Esters | 3.8 | 1.4 | 1.1 | 16.4 |

It is seen from the data in Table I that phthalic acid and toluic acid of purities of about 87% may be obtained by using very crude separations according to the present invention. The purity of the phthalic acid could be improved significantly if decanting operations had not been used. Furthermore, the purity of the toluic acid could be improved by adjusting the ratio of solvent to the oxygenated materials or by a second recrystallization. Similarly, the amount of toluic acid and the filtrate indicates that a second recrystallization could be used to recover further toluic acid.

*Example 2*

A mixture of methylterephthalic acid and 2,4-dimethylbenzoic acid obtained by the oxidation with nitric acid of methylmethoxy xylene may be separated, according to the present invention, by using cyclohexane. Separation is illustrated by the following simple test: 200 cc. of hot (80° C.) cyclohexane readily dissolved 10 grams of 2,4-dimethylbenzoic acid. However, this same quantity of hot (80° C.) cyclohexane failed to dissolve 0.1 gram of methylterephthalic acid. The 2,4-dimethylbenzoic acid is insoluble in cold (0° C.) cyclohexane.

The nature and objects of the present invention having been completely described and illustrated and the best mode set forth, what we wish to claim as new and useful and secure by Letters Patent is:

1. A method for separating monobasic $C_8$ and $C_9$ aromatic acids from dibasic $C_8$ and $C_9$ aromatic acids from a mixture containing at least one monobasic acid and at least one dibasic acid which comprises heating said mixture with a saturated $C_5$ to $C_8$ liquid hydrocarbon whereby monobasic acid will dissolve in said hydrocarbon and said dibasic acid remains as a solid phase, separating said hydrocarbon from said solid phase, cooling said hydrocarbon whereby monobasic acid precipitates as a solid, and recovering said solid monobasic acid.

2. A method in accordance with claim 1 wherein said mixture is heated to a temperature approximately corresponding to the boiling point of the solution.

3. A method in accordance with claim 1 wherein said saturated hydrocarbon is selected from a $C_6$ to $C_7$ hydrocarbon.

4. A method in accordance with claim 1 wherein said hydrocarbon is cyclohexane.

5. A method in accordance with claim 1 wherein said hydrocarbon is n-hexane.

6. A method in accordance with claim 1 wherein said said mixture is heated with about 15 to about 85 volume percent of said hydrocarbon.

7. A method for separating monobasic $C_8$ and $C_9$ aromatic acids from dibasic $C_8$ and $C_9$ aromatic acids from a mixture containing the corresponding monobasic and dibasic acid which comprises heating said mixture with a saturated $C_5$ to $C_8$ liquid hydrocarbon whereby monobasic acid will dissolve in said hydrocarbon and said dibasic acid remains as a solid phase, separating said hydrocarbon from said solid phase, cooling said hydrocarbon whereby monobasic acid precipitates as a solid, and recovering said solid monobasic acid.

8. A method for separating toluic acid from phthalic acid from a mixture containing both toluic and phthalic acid which comprises heating said mixture with n-hexane to substantially the boiling point of the n-hexane solution whereby toluic acid is dissolved in said n-hexane and phthalic acid remains as a solid, separating said phthalic acid from said n-hexane and toluic acid solution, cooling said n-hexane and toluic acid solution whereby said toluic acid precipitates as a solid, and recovering said toluic acid.

9. A method for separating 2,4-dimethylbenzoic acid from methylterephthalic acid from a mixture containing both 2,4-dimethylbenzoic and methylterephthalic acid which comprises heating said mixture with cyclohexane to substantially the boiling point of the cyclohexane solution whereby 2,4-dimethylbenzoic acid is dissolved in said cyclohexane and methylterephthalic acid remains as a solid, separating said methylterephthalic acid from said cyclohexane and 2,4-dimethylbenzoic acid solution, cooling said cyclohexane and 2,4-dimethylbenzoic acid solution whereby said 2,4-dimethylbenzoic acid precipitates as a solid, and recovering said 2,4-dimethylbenzoic acid.

References Cited by the Examiner
UNITED STATES PATENTS 3,098,855  7/1963  Couper et al. _____ 260—525

LORRAINE A. WEINBERGER, *Primary Examiner.*

S. B. WILLIAMS, *Assistant Examiner.*